United States Patent [19]

Drake et al.

[11] Patent Number: 4,652,097
[45] Date of Patent: Mar. 24, 1987

[54] GLASS ARTICLE HAVING RENEWABLE OPTICAL SURFACES

[75] Inventors: Cyril F. Drake, Harlow; Gilles D. Pitt, Saffron Walden; Alfred J. Arch, Ongar; Rosamund C. Neat, Forest Gate, all of Great Britain

[73] Assignee: International Standard Electric Corporation, New York, N.Y.

[21] Appl. No.: 676,327

[22] Filed: Nov. 29, 1984

[30] Foreign Application Priority Data

Dec. 7, 1983 [GB] United Kingdom ................. 8332681

[51] Int. Cl.⁴ .............................................. G02B 00/00
[52] U.S. Cl. .................................................... 350/582
[58] Field of Search ....................... 350/319, 363, 582; 501/45; 73/324; 206/524.5, 524.7

[56] References Cited

U.S. PATENT DOCUMENTS 3,922,999 12/1975 Meginnis .............................. 350/319
4,350,675 9/1982 Drake ................................... 501/11
4,517,006 5/1985 Drake et al. ........................... 501/45

Primary Examiner—John K. Corbin
Assistant Examiner—Vincent J. Lemmo
Attorney, Agent, or Firm—T. L. Peterson

[57] ABSTRACT

A transparent glass article, e.g., for use as an inspection window in contact with water, including at least a surface layer of a glass which is adapted to dissolve at a preselected uniform rate. Slow dissolution of the glass provides a continuously renewable clear surface.

9 Claims, 3 Drawing Figures

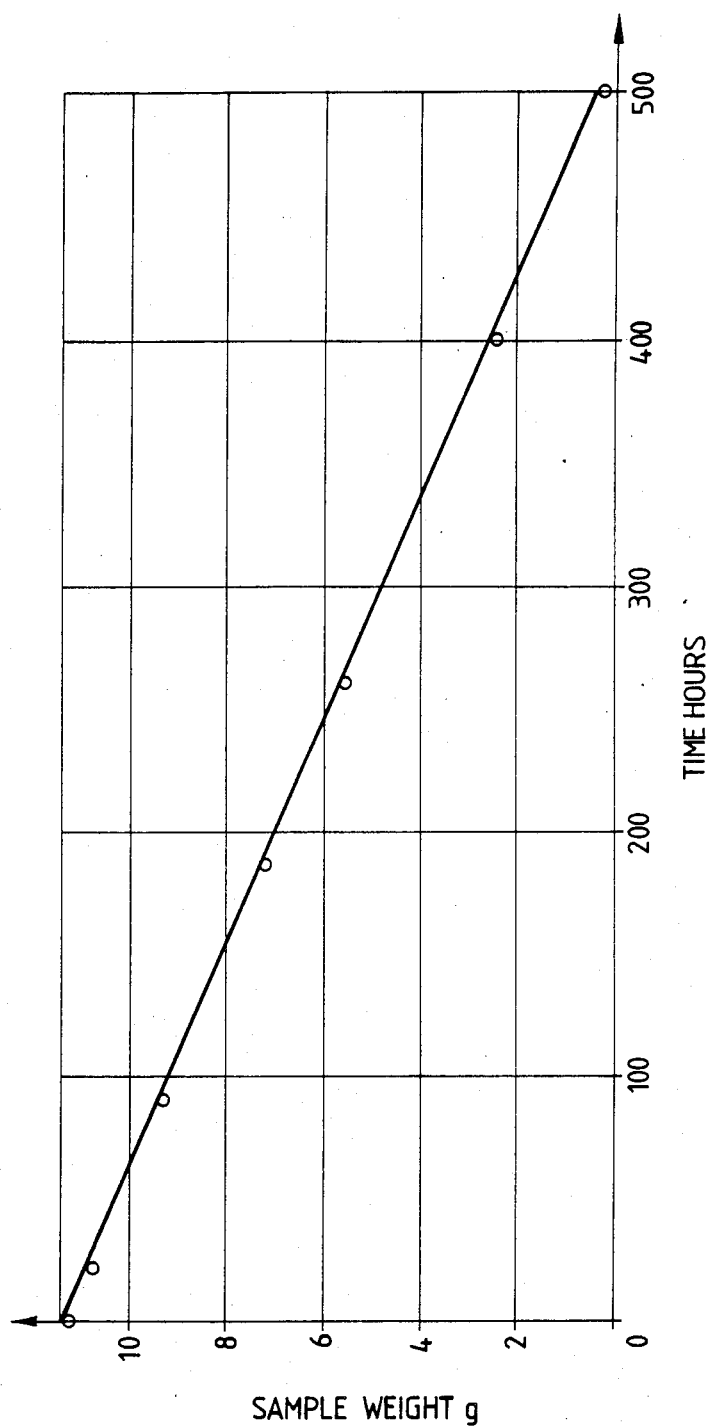

GLASS ARTICLE HAVING RENEWABLE OPTICAL SURFACES

BACKGROUND OF THE INVENTION

The present invention relates to an optically transparent glass article for use in an aqueous environment, and is directed more particularly to a glass article at least part of which is adapted to dissolve at a rate which assures the maintenance of its optical transparency.

Optically transparent glass windows are used in contact with water or an aqueous medium in a variety of applications. One problem that is frequently encountered in such applications is the fouling of the glass by water borne dirt and/or microbial lifeforms. In some cases this fouling can be so extreme as to completely obscure the glass. Since removal of the glass for cleaning may in some circumstances be difficult or costly, it is desirable to minimize or to prevent such fouling.

Various techniques have been proposed for overcoming this problem. The addition of bioxides to the water is a well-established practice, but will not prevent non-biological fouling. Such fouling is a particular problem in instruments that measure the concentration of oil in water.

SUMMARY OF THE INVENTION

In accordance with the present invention there is provided a glass article which is adapted to minimize or overcome the above described problem.

According to the invention there is provided an optically transparent glass article for use in an aqueous environment, wherein at least a surface layer of the article comprises a water soluble glass which, when in contact with the aqueous enviroment, is continuously renewed by the dissolution of the glass.

The surface of the glass article, e.g., an inspection window or an optical transmission element, dissolves at a uniform and controllable rate thus constantly renewing the surface and thereby preventing the deposition of obscuring matter.

DESCRIPTION OF THE DRAWINGS

Other objects and advantages of the present invention will be apparent from the following description and drawings, in which:

and FIG. 2 illustrates a typical surface dissolution characteristic of the inspection window of FIG. 1.

DESCRIPTION OF THE PREFERRED EMBODIMENT

Figures 1, 1A:
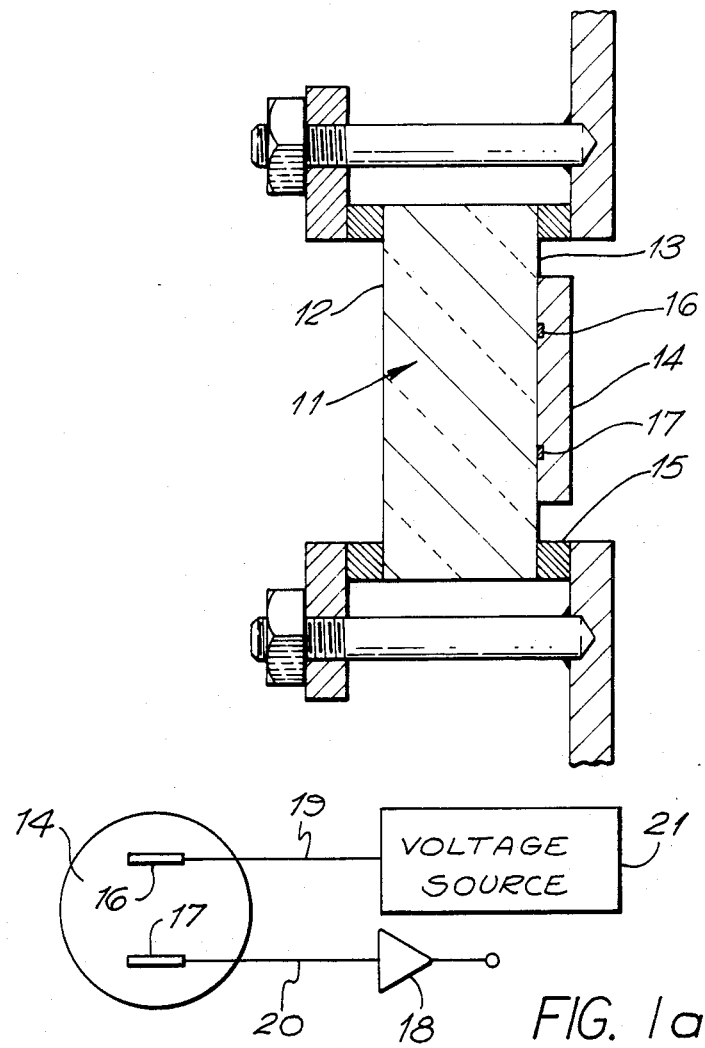
FIG. 1 is a cross-sectional view of a glass inspection window having a renewable surface.
FIG. 1a illustrates the manner in which embedded electordes are used to indicate when the renewable surface of a glass inspection window has completely dissolved.

Referring to FIG. 1, the inspection window comprises a transparent glass body 11 having two parallel major surfaces 12, 13 one of which (13) is provided with a surface layer or coating 14 of a transparent water soluble galss, the composition of which will be described presently. In use the window is mounted via sealing gaskets 15 such that its coated surface 14 is exposed to an aqueous medium whereby the soluble layer 14 dissolves slowly at a controlled and uniform rate. This continuously presents a fresh surface to the aqueous medium and thus effectively prevents the fouling and consequent loss of transparency of the window.

It will be apparent that it is not essential for the water soluble glass to be confined to surface layer 14. Thus the entire body of the window may be formed from water soluble glass.

Body 11 maybe formed by any of the conventional techniques of glass working, e.g., it may be cast or cut from a drawn rod. The layer 14 may be applied by the fusion of a piece of water soluble glass on a substrate of ordinary glass or by a vapor deposition process.

A number of glass compositions are suitable for use informing surface layer 14. However, we prefer to employ phosphate glasses including, but not limited to, phosphorus pentoxide, one or more alkale metals and one or more alkaline earth metals. The dissolution rate of the glass is controlled via its composition. An increase in the alkaline earth metal content will, for example, reduce the dissolution rate while an increase in the alkaline metal content will increase the dissolution rate. A significant reduction of the dissolution rate can also be achieved by the addition of alumina to the glass. The techniques of glass dissolution rate control are more fully described in our U.S. Pat. No. 4,350,675.

The following example will illustrate the invention. A glass was prepared by melting a batch comprising the following constituents:

$MgH_4(PO_4)_2.2H_2O$; 225g
$KH_2PO_4$; 35g
$CaCO_3$; 30g
$Na_2CO_3$; 152g
$NaH_2PO_4$; 719g

This mixture was fused at 1150° C. for 1 hour to decompose the constituents to the corresponding oxides giving a glass having the composition:

$Na_2O$; 44.3 mole %
$K_2O$; 1.3 mole %
$CaO$; 3.0 mole %
$MgO$; 10.2 mole %
$P_2O_5$; 41.2 mole %

This glass was then cast on to a cold plate, ground to a powder and remelted at 1150° C. for 1 hour with occasional stirring. The resulting melt was poured into a cast iron mold to form a cylindrical rod which was annealed by cooling from 310° C. to 20° C. over a period of 24 hours. Circular glass windows were then prepared by slicing the rod perpendicular to its axis and polishing the parallel faces of each slice.

One face of each window was exposed to flowing mains water and periodic measurements were made of the corresponding weight loss, the results being summarized in FIG. 2. Visual examination of the windows after exposure showed that there was surprisingly uniform erosion of the surfaces with substantially no impairment of their optical quality. This example illustrates the feasibility of the techniques described herein.

The glass article of the invention may be used in a variety of applications. In particular it may be employed in the optical system of an instrument for measuring the concentration of oil in water to overcome the problem of window fouling cased by oil deposition. Other applications include transparent glass water interfaces for under water video devices and for submersible craft.

When there is the possibility of biological fouling, for example by algal or slime growth, small amounts of biocidal inorganic materials may be included in the glass composition. Suitable substances which will not impair the transparency of the window include As, Bi, Zn, Pb, Ba, and Ag. These metals can be added to the batch as their oxides and will liberate biocidal metal ions when the glass is dissolved. Boron can also be added as boric oxide or borax and will liberate borate ions. Similarly fluorine can be added as a metal fluoride and will liberate F-ions.

In a further application the soluble glass may be deposited as a surface film beneath which a pair of sensor electrodes 16 and 17 are disposed, as shown in FIG. 1. Complete dissolution of the surface film exposes the electrodes to the aqueous medium thus providing a high resistance conductive path therebetween. An amplifier 18 coupled to the electrodes may be used to monitor this resistance and thus provide an indication of the dissolutin of the surface layer as shown in FIG. 1a. Leads 19 and 20 used to connect the electrodes 16 and 17 to a voltage source 21 and the amplifier are, of course, insulated.

Dissolution of the glass may also be monitored by standard optical techniques, e.g., refractive index measurement or interferometry.

What is claimed is:

1. An optically transparent glass article for use in aqueous environments, comprising: a body of glass having a first surface of a first section for exposure to the aqueous environment and a second surface of a second section not exposed to said environment, a portion of the body defining said first surface being adapted to dissolve at a preselected rate sufficient to prevent the fouling of said first surface.

2. The article of claim 1 in which said first section of said body is composed of a phosphate glass.

3. The article of claim 2 in which said first section of said body contains a water soluble biocidal material.

4. The article of claim 1 in which said first section of said body is composed of a phosphate glass.

5. The article of claim 1 in which said first section of said body is composed of a mixture of phosphorous pentoxide, an alkali metal oxide and an alkaline earth metal oxide.

6. The article of claim 5 in which said first section of said body contains a water soluble biocidal material.

7. The article of claim 1 in which said first section of said body is composed of a mixture of phosphorous pentoxide, an alkali metal oxide an an alkaline earth metal oxide.

8. The article of claim 1 in which said first section of said body contains a water soluble biocidal material.

9. The article of claim 1 including a plurality of electrically conductive electrodes disposed at least partly within said first section of said body.

* * * * *